(12) United States Patent
Guan et al.

(10) Patent No.: US 12,118,695 B2
(45) Date of Patent: Oct. 15, 2024

(54) NOISE ESTIMATION

(71) Applicant: HUAWEI TECHNOLOGIES CO., LTD., Guangdong (CN)

(72) Inventors: Hao Guan, London (GB); Gregory Slabaugh, Munich (DE); Liu Liu, Beijing (CN); Sean Moran, Munich (DE); Zhongqian Fu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 468 days.

(21) Appl. No.: 17/480,548

(22) Filed: Sep. 21, 2021

(65) Prior Publication Data

US 2022/0005159 A1 Jan. 6, 2022

Related U.S. Application Data

(63) Continuation of application No. PCT/EP2019/057136, filed on Mar. 21, 2019.

(51) Int. Cl.
*G06T 5/70* (2024.01)
(52) U.S. Cl.
CPC ...... *G06T 5/70* (2024.01); *G06T 2207/20081* (2013.01)
(58) Field of Classification Search
CPC .............. G06T 5/70; G06T 2207/20081
See application file for complete search history.

(56) References Cited

U.S. PATENT DOCUMENTS

| 7,206,455 | B1 | 4/2007 | Hatipoglu |
| 10,032,256 | B1 | 7/2018 | Anaya et al. |
| 2012/0224789 | A1 | 9/2012 | Chatterjee et al. |
| 2019/0105009 | A1* | 4/2019 | Siemionow .......... A61B 6/5229 |

FOREIGN PATENT DOCUMENTS

| CN | 103177424 A | 6/2013 |
| CN | 108416755 A | 8/2018 |
| CN | 109285129 A | 1/2019 |

OTHER PUBLICATIONS

Chatterjee et al., "Noise suppression in low-light images through joint denoising and demosaicing," CVPR 2011, IEEE, Jun. 2011, 8 pages.

(Continued)

*Primary Examiner* — Diane D Mizrahi
(74) *Attorney, Agent, or Firm* — Fish & Richardson P.C.

(57) ABSTRACT

One example image processing device is provided. The example image processing device can include at least one processor and one or more memories coupled to the at least one processor and storing programming instructions for execution by the at least one processor to estimate noise in an image, the image being represented by a set of pixels and each pixel of the set of pixels having a value associated with it on each of one or more channels, where estimating the noise comprises processing, using a first trained model that detects stochastic noise, data derived from the image to form a first noise estimate, processing, using a second trained model that detects extreme pixel values, data derived from the image to form a second noise estimate, and combining the first and second noise estimates to form an aggregated noise estimate.

15 Claims, 6 Drawing Sheets

(56) References Cited

OTHER PUBLICATIONS

Choi et al., "Optimal Combination of Image Denoisers," IEEE Transactions on Image Processing, vol. 28, No. 8, Aug. 2019, 16 pages.
Lehtinen et al., "Noise2Noise: Learning Image Restoration without Clean Data," arXiv preprint, arXiv:1803.04189v3, Oct. 29, 2018, 12 pages.
PCT International Search Report and Written Opinion issued in International Application No. PCT/EP2019/057136 on Nov. 27, 2019, 13 pages.
Remez et al., "Deep Convolutional Denoising of Low-Light Images." arXiv preprint, arXiv:1701.01687v1, Jan. 6, 2017, 11 pages.
Ronneberger et al., "U-net: Convolutional networks for biomedical image segmentation," International Conference on Medical Image Computing and Computer-Assisted Intervention, May 18, 2015, 8 pages.
Rudin et al., "Nonlinear Total Variation Based Noise Removal Algorithms," Physica D: Nonlinear Phenomena, vol. 60n Nos. 1-4, Nov. 1992, 10 pages.
Wang et al., "Variational-Based Mixed Noise Removal With CNN Deep Learning Regularization," IEEE Transactions on Image Processing, vol. 29, Sep. 2019, 13 pages.
Zhang et al., "Beyond a Gaussian Denoiser: Residual Learning of Deep CNN for Image Denoising." IEEE Transactions on Image Processing, Aug. 13, 2016, 13 pages.

\* cited by examiner

NOISE ESTIMATION

CROSS-REFERENCE TO RELATED APPLICATIONS

This application is a continuation of International Application No. PCT/EP2019/057136, filed on Mar. 21, 2019, the disclosure of which is hereby incorporated by reference in its entirety.

TECHNICAL FIELD

This disclosure relates to estimating noise in images.

BACKGROUND

When images are captured by a camera, noise can manifest in the captured image. The noise reduces the fidelity of the captured image. When the camera that is being used is a digital camera, the image noise can arise from a number of sources. Firstly, it can arise from stochastic processes associated with the capturing of the image. This stochastic noise can, for example, results from noise in the image sensor. Stochastic noise varies from image to image as detected by a particular camera. Secondly, noise can result from deterministic sources such as faulty pixels in the image sensor. This noise is generally consistent for a particular camera, except when additional pixels fail or perhaps recover.

Some circumstances are especially prone to image noise. For example, when a digital camera is capturing images in low light conditions the camera can increase the gain of its sensor to amplify the brightness of captured data. However, this results in an increase in stochastic noise. Increasing sensor gain has the disadvantage of amplifying noise. As a consequence, noise removal can significantly improve the quality of images captured in low light conditions.

It is desirable to be able to process an image after it has been captured in order to reduce the appearance of noise. This makes the image look better. One way to do this is to apply a filter to blur the image somewhat. This reduces high-frequency noise but makes the image less sharp. Another approach is to estimate the noise in the originally captured image and then attempt to remove that estimated noise from the originally captured image so as to form an adjusted, de-noised image.

Estimating the noise in an image is difficult. Some prior approaches are discussed in Chatterjee, Priyam, et al. "Noise suppression in low-light images through joint denoising and demosaicing." CVPR 2011. IEEE, 2011 and Remez, Tal, et al. "Deep convolutional denoising of low-light images." arXiv preprint arXiv:1701.01687 (2017).

Rudin, Leonid I., Stanley Osher, and Emad Fatemi. "Nonlinear total variation based noise removal algorithms." Physica D: nonlinear phenomena 60.1-4 (1992): 259-268 proposes a nonlinear variational algorithm to remove noise based on partial differential equations implementing the total variational loss.

There is a need for an improved approach to estimating noise in an image.

SUMMARY

Embodiments of the application are defined by the features of the independent claims. Further advantageous implementations of the embodiments are defined by the features of the dependent claims.

According to one aspect there is provided an image processing device comprising a processor configured to estimate noise in an image, the image being represented by a set of pixels and each pixel having a value associated with it on each of one or more channels, by the steps of: processing data derived from the image by means of a first trained model for detecting stochastic noise so as to form a first noise estimate; processing data derived from the image by means of a second trained model for detecting extreme pixel values to form a second noise estimate; and combining the first and second noise estimates to form an aggregated noise estimate.

According to a second aspect there is provided a method for training an image processing model, comprising: (a) receiving a plurality of pairs of images, each pair of images representing a common scene and a first image of each pair containing more noise than a second image of the pair; (b) for each pair of images: (i) processing data derived from the first image of the pair by a first model to estimate stochastic noise in the images so as to form a first noise estimate; (ii) processing data derived from the first image of the pair by a second model for detecting extreme pixel values to form a second noise estimate; (iii) combining the first noise estimate and the second noise estimate to form an aggregated noise estimate; (iv) estimating the difference between (A) the second image of the pair and (B) the first image of the pair de-noised in dependence on the aggregated noise estimate; and (v) adapting the first and second models in dependence on the estimated difference.

The first trained model may be suitable and/or adapted for detecting Poisson noise and/or Gaussian noise. This type of noise can occur in digitally captured images.

The first trained model may have a higher accuracy in detecting Poisson noise and/or Gaussian noise than the second trained model. The models may in this regard be functionally different, which may lead the overall system to perform better once the models have been trained in their differing respects.

The second trained model may have a higher accuracy in detecting defective pixel noise than the first trained model. The second model may be adapted and/or suitable for detecting defective pixel noise. It may be adapted for detecting extreme isolated pixel values.

The device may be configured to subtract the aggregated noise estimate from the image to form a de-noised image. The de-noised image may appear better to a viewer.

The device may be configured to process the image and the aggregated noise estimate by means of a third trained model to form a de-noised image. This may improve the perceived result of de-noising the original image.

The first and second trained models may comprise processing architectures arranged for: (a) processing data derived from the image so as to progressively reduce resolution through a first series of stages to form intermediate data; and (b) processing the intermediate data to progressively increase resolution through a second series of stages to form the respective noise estimate; there being skip connections for providing feed-through between corresponding stages of the first and second series. This may be an effective way to configure the models to achieve good trainability and applicability.

The first series of stages of the second trained model may include: (a) a first stage for processing data derived from the image to reduce resolution and increase data depth so as to form second intermediate data, and (b) a second stage for processing the second intermediate data to reduce resolution without increasing data depth so as to form third intermediate data. This may be especially suited to working with defective pixel noise.

The first stage may be a space-to-depth stage. This may reduce spatial resolution whilst preserving data, by increasing the data depth at the retained pixel points, avoiding data loss.

The second stage may be a max pooling stage. It may be that none of the stages in the first series of stages of the first trained model increases data depth. This may reduce resolution in a lossy way, allowing more efficient subsequent processing.

The first and second models may comprise processing architectures arranged for: (a) processing data derived from the first image of the pair so as to progressively reduce resolution through a first series of stages to form intermediate data; and (b) processing the intermediate data to progressively increase resolution through a second series of stages to form the respective noise estimate; there being skip connections for providing feed-through between corresponding stages of the first and second series; and the first series of stages of the second trained model may include: (a) a first stage for processing data derived from the first image of the pair to reduce resolution and increase data depth so as to form second intermediate data, and (b) a second stage for processing the second intermediate data to reduce resolution without increasing data depth so as to form third intermediate data.

According to a third aspect there is provided an image processing model adapted by the method described above. The model may be stored on a data carrier. The model may be stored in non-transient form. The model may comprise neural network weights. The model may comprise a neural network.

According to a fourth aspect there is provided an image processing device comprising a processor and a memory, the memory storing in non-transient form instructions executable by the processor to implement an image processing model as described above.

Details of one or more embodiments are set forth in the accompanying drawings and the description below. Other features, objects, and advantages will be apparent from the description, drawings, and claims.

BRIEF DESCRIPTION OF THE DRAWINGS

The present application will now be described by way of example with reference to the accompanying drawings.

In the drawings.

DESCRIPTION OF EMBODIMENTS

Figure 1:
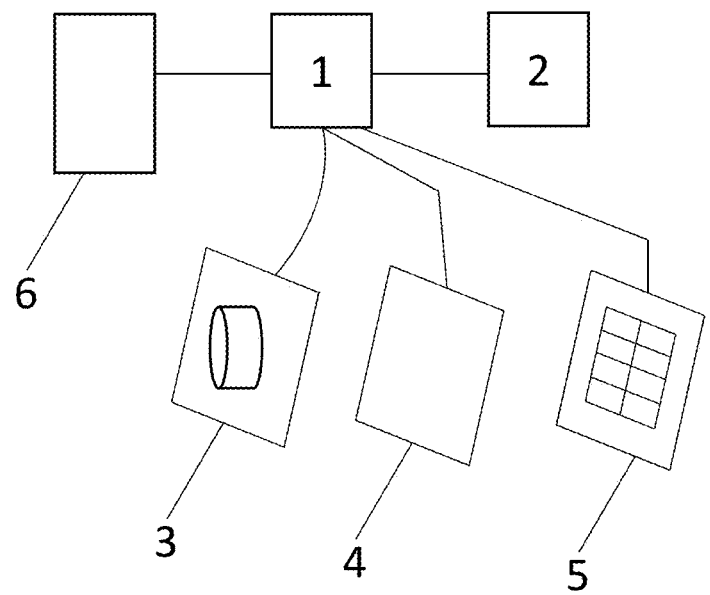
FIG. 1 shows the general architecture of a device for implementing the present application.

FIG. 1 shows the general architecture of a device for implementing the present application. The device has a processor 1, a memory 2, a camera 3, a display 4, a keypad 5 and a data interface 6. The memory 2 stores in a non-transient way instruction code that is executable by the processor to permit the device to perform the functions described of it herein. The camera 3 can be commanded using the keypad 5 to take photographic images. The images are then stored as data in the memory 2. The keypad 5 can be integrated with the display 4 in a touch screen. The data interface 6 permits the device to receive data from and send data to a remote location, for example over the internet. The device could, for example, be a mobile or cellular phone. The device could be a server computer, in which case it might lack the camera 3, the display 4 and the keypad 5. The device could be a dedicated camera, in which case it might lack the data interface 6. Other physical configurations are also possible.

In operation, the memory 2 can hold an image that has been captured by the camera 3 or received over the data interface 6. The processor 1 can then execute stored code to reduce noise in the image by the methods discussed below, forming a de-noised image. Then the processor 1 can cause the display to display the de-noised image, or can transmit it to another location over the data interface 6.

Figure 2:
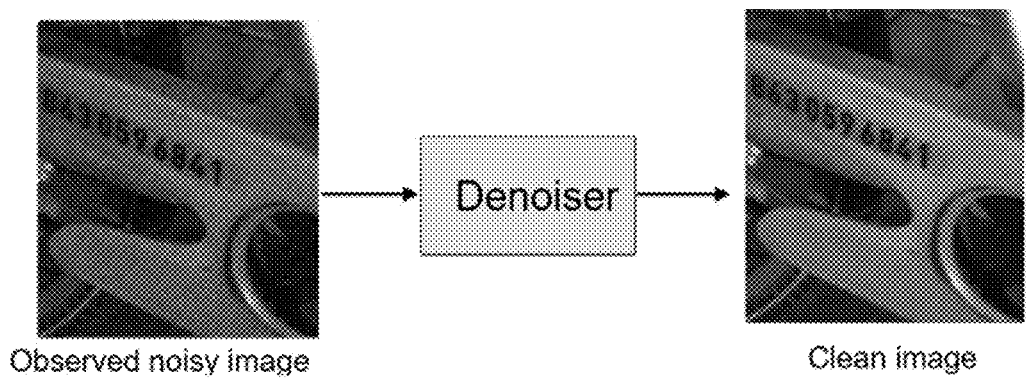
FIG. 2 shows noisy and cleaner images.

FIG. 2 illustrates an example of de-noising. An observed noisy image is passed through a de-noiser. The de-noiser outputs a de-noised or "clean" image. A de-noised image will typically not have all noise removed from it.

Figure 3:
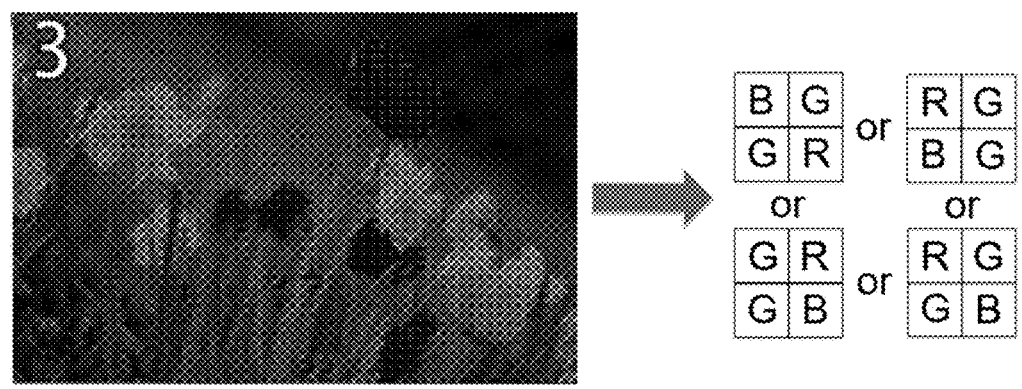
FIG. 3 shows the arrangement of pixels in a RAW formatted image.

A digital image is formed of pixels. Differing interpretations of the term "pixel" are commonly used. In one interpretation, a single pixel includes encoding for multiple primary colours. In this interpretation, a pixel may include separate red ("R"), green ("G") and blue ("B") values or regions. In another interpretation, a pixel may encode for a single colour. For example, an image in the RAW format is broken down into multiple 2×2 blocks, with each block containing four elements. (See FIG. 3). Each element encodes for a single colour as indicated by "R", "G", "B" in FIG. 3. The elements within each block may be considered to be pixels. In monochrome images, pixels may encode simply for grey-scale data.

Figure 4:
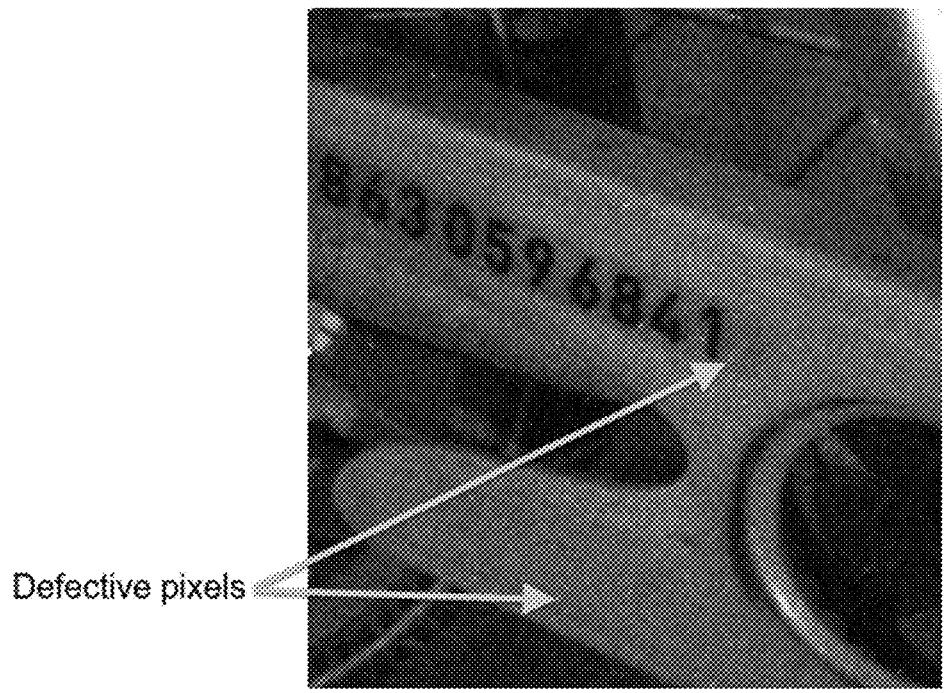
FIG. 4 shows the result of defective pixels.

Noise in a digital camera image mainly arises from three sources:

1. Read noise: arising from the electronics in the imaging sensor. This is stochastic noise and can typically be modelled with a Gaussian distribution.
2. Shot noise: related to quantisation of the number of photons arriving at the sensor, and therefore brightness dependent. This is stochastic noise and can typically be modelled with a Poisson distribution.
3. Defective pixel noise: Individual pixels on the camera's sensor can vary in their sensitivity to incoming light. This can occur as a consequence of the manufacturing process of the sensor, or due to random failures during service. Although the incidence of these effects may vary gradually for a particular sensor over time, that variation is generally slow. A defect in a pixel can result in impulsive noise effects: i.e. in the pixel becoming saturated (and hence reporting maximum brightness) or capturing no light (and hence reporting minimum brightness). It can also result in a pixel reporting an erroneous intermediate level. Examples of defective pixel noise are shown in FIG. 4.

In the methods to be described below, an artificial intelligence model is trained to detect noise in images. This can be done by training the model on a dataset comprising pairs of images of the same scene, with one image of each pair exhibiting substantial noise and the other being substantially noise free. For each pair of images, the relatively noisy image is input to the current state of the model. The model estimates the noise in the image. A supposed de-noised image is formed by removing the estimated noise from the relatively noisy image. Then the supposed de-noised image is compared with the relatively noise-free image. Depending on the result of the comparison the model is adapted (e.g. by changing the weights in a neural network comprised in the model) to reinforce accurate noise estimation by the model. Once the model has been trained in this way on multiple training image pairs, it can be run on other images to estimate the noise in them. Conveniently, the model can be trained on one device, for example a computer server, and then loaded into other devices, for example cameras or mobile/cellular phones comprising cameras. Those other devices can then run the model to help remove noise from images they have captured. The devices running the trained model do not need the capability to train the model themselves, although a device of the type shown in FIG. 1 could be used to train the model. The trained model can be provided to devices in the form of executable code or, if a device already has executable code for a suitable generic model the trained model can be provided to such a device in the form of weights or values to be used in that model. The trained model can be provided to a device at manufacture, dynamically (e.g. as a download) or in non-volatile storage on a memory device. The trained model can be stored in the device in non-transient form in suitable memory.

In addition to training the model on the appearance of the training images, the ISO or sensitivity with which the images were taken may also be used as a training input. It may also be used as an input when the trained model is run.

Preferably, the system estimates the noise in an image using the image's appearance as well as the ISO used (which is known at the time the photo is taken). The system decomposes the noise into estimates of (i) stochastic noise, preferably including Gaussian- and Poisson-type noise and (ii) deterministic noise, preferably including defective pixel noise. Separate subnetworks can be used to estimate each of these. Using separate trainable or trained subnetworks for these two classes of noise has been found to yield improved results in the accuracy with which noise can be estimated. The networks can usefully be trained in a multi-task setting. One task is to estimate the stochastic noise, and the other task is to estimate the deterministic noise. In a convenient embodiment there can be separate subnetworks for these two estimations. The two noise estimates: stochastic (i.e. Gaussian plus Poisson noise) and deterministic (i.e. defective pixel noise) are combined to form an overall noise estimate. Then the overall noise estimate is used to de-noise the original image. This can be done by subtracted the noise estimate from the original image or by using a further trained de-noising network.

Each subnetwork can be pre-trained separately using synthesized noise. Thus, the training process described above can be implemented on each network individually, with the relatively noisy input images in each case containing predominantly the type of noise (stochastic or deterministic/defective pixel) that is being trained for. Then, the two pre-trained models can be combined into a full architecture. If desired, that full architecture can be trained using images that contain both types of noise: e.g. non-synthetic or real image data.

To train the sub-networks separately, noise can be synthesized to apply to non-noisy training images so as to form the relatively noisy training images. To synthesize the stochastic noise it is possible to use a sequence of (e.g. 12) images captured in a low light environment with a static camera. These frames can be averaged to a mean image, which serves as the relatively low-noise training image. A variance image can then be computed for each pixel across the sequence. Poisson noise in images is intensity dependent. Accordingly, a linear equation can be fitted to the noise variance as a function of intensity/brightness, using least squares and/or RANSAC. Using this linear equation noise can be characterised using the stochastic (Gaussian plus Possion) noise model. Any pixels in images of the sequence that exhibit noise that is inconsistent with the model can be considered as defective pixel noise. Conveniently, any pixels whose intensities lie outside of a 99% confidence interval about the estimated stochastic noise distribution can be treated as defective pixels. In this way, for each image in the sequence estimates can be formed of (a) its stochastic noise and (b) its deterministic noise. Then for each image in the sequence two images can be formed: one containing only that stochastic noise and the other containing only that deterministic noise. Each of those can be paired with the relatively low-noise image and used to train the respective part of the model.

A RAW image is a lossless image format. Unlike an image in RGB format a RAW format image is composed of the Bayer pattern. Each block of pixels in the Bayer pattern can be either BGGR, RGGB, GRGB or RGGB. At each pixel there is only a red, green, or blue colour. It is advantageous to use images in RAW format as input to the model, for both training and at run time. With RAW images, more detail can be preserved, in comparison to images that have had dynamic range compression applied. The Bayer pattern structure of RAW images (see FIG. 3) makes it hard to use some conventional methods to perform image augmentation. Using the split-model approach described above, it is possible to train each model to separately have the capability to de-noise a respective one of the stochastic and the impulse noise.

The present system provides a decomposition network to estimate noise as decomposed into (i) stochastic/Gaussian+ Poisson noise and (i) deterministic/impulsive noise. Such a network is shown schematically in FIG. 5. The overall structure is a network comprising two sub-networks. Each sub-network is a neural network which operates independently of the other. Weights in one sub-network do not affect the operation of the other sub-network. One of the sub-networks estimates stochastic noise. The other estimates deterministic noise. The sub-networks may have any suitable form, but generally put they can be networks that each regress a noise value at each pixel in the input RAW data.

Figure 5:
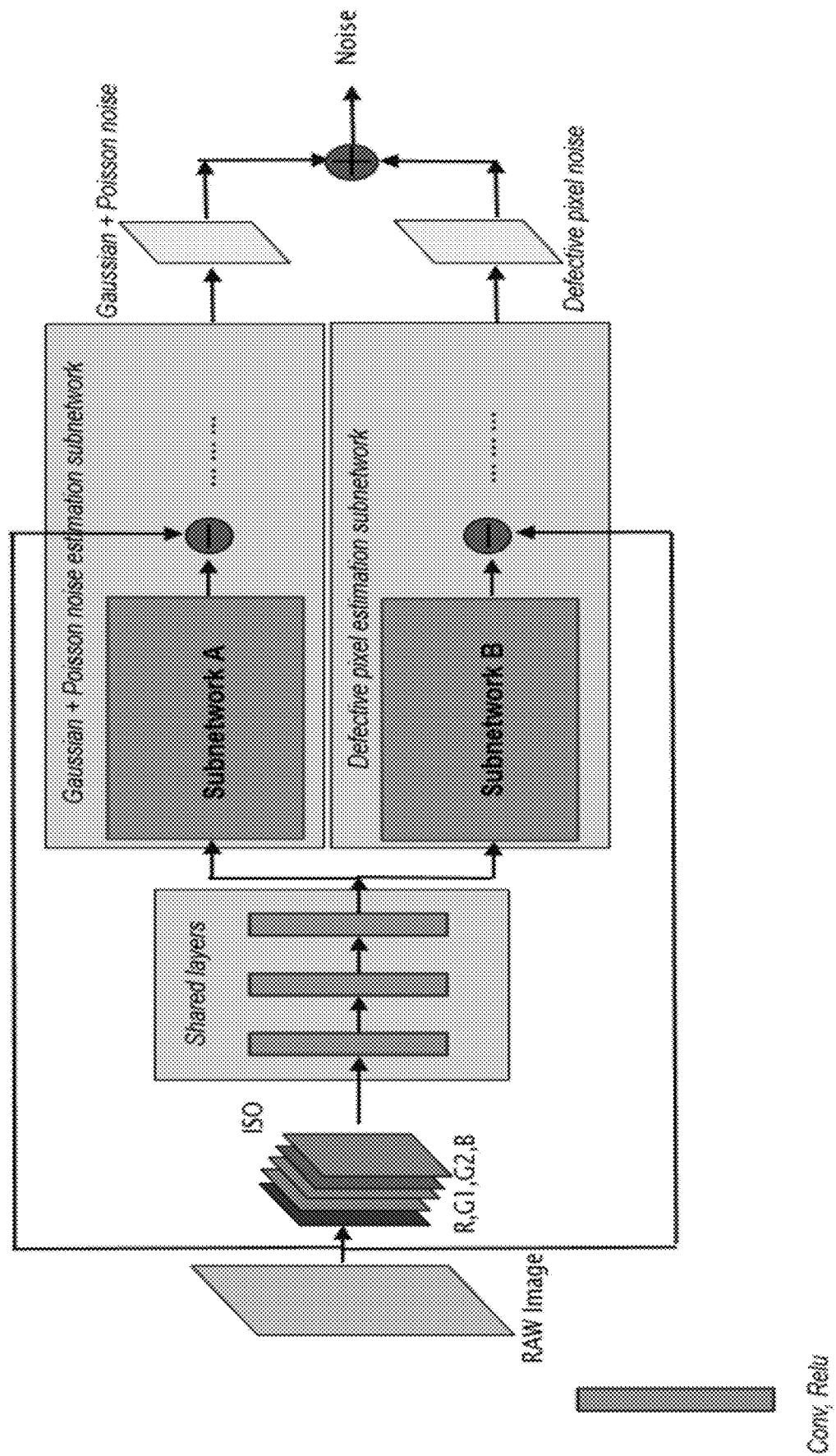
FIG. 5 shows a first processing architecture.

In the architecture of FIG. 5, the following steps are performed on an individual input image. In this example the input image will be assumed to be in RAW format, but it could be in any suitable format.

1. The input image is first packed in to four channels (R, G1, G2, B), corresponding to the Bayer pattern used in RAW encoding. For other forms of encoding, the packing could be different. These channels are at half the resolution in width and height of the original input image. One advantage of packing in this way is to group same-colour pixels together.
2. The ISO setting with which the image was captured is provided as an input on a fifth channel.
3. The network may utilise a "shared layers" block to extract features. This can be done using convolutions and rectified linear units (ReLU), or in other ways. The shared layers extract features that are common to the tasks of both sub-networks. The shared layers can also be known as coupling layers. They can be used to assemble features at relatively high resolution to make connections between the two sub-networks. After the pre-training of each sub-network individually, these coupling layers can enable the overall architecture to update the weights of each sub-network based on training data that contains both types of noise.

4. The upper sub-network branch ("subnetwork A") estimates the stochastic noise.
5. The lower sub-network branch ("subnetwork B") estimates the deterministic noise.
6. The noise estimates are added together to form an aggregate noise estimate. The aggregate noise estimate can be subtracted from the original image to produce a de-noised result.

Figure 6:
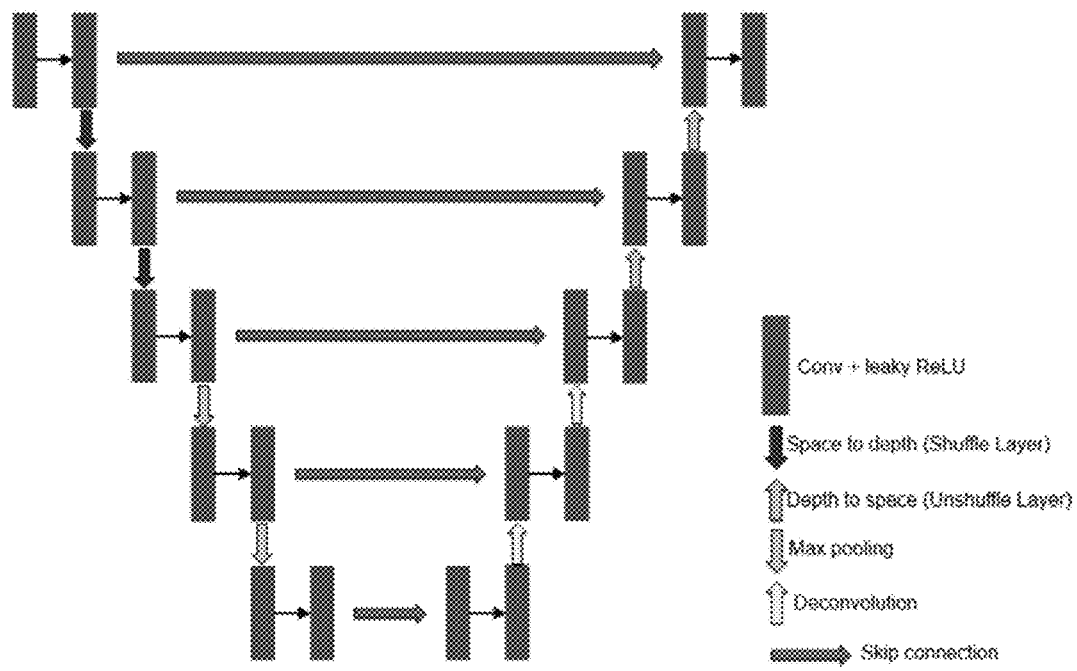
FIG. 6 shows an example of a trainable subnetwork architecture.

Each sub-network A or B can independently be formed using any suitable trainable network architecture. Examples include neural networks such as the Unet. (See Ronneberger, Olaf, Philipp Fischer, and Thomas Brox. "U-net: Convolutional networks for biomedical image segmentation." International Conference on Medical image computing and computer-assisted intervention. Springer, Cham, 2015). Conveniently the Unet can be modified as shown in FIG. 6. FIG. 6 shows the steps in downsampling and subsequently upsampling an input image that may be performed in an example of either subnetwork A or B. An image input is provided at the top left corner of the flow shown in FIG. 6. This input is at a top layer of the data flow of FIG. 6. In FIG. 6, rectangles indicate steps of convolution and leaky ReLU (rectified linear unit). In a downsampling path, shown on the left side of FIG. 6, the input is transformed using a first space-to-depth transformation to data at a second layer. The data at the second layer is transformed using a second space-to-depth transformation to data at a third layer. The data at the third layer is transformed using a first max pooling transformation to data at a fourth layer. The data at the fourth layer is transformed using a second max pooling transformation to data at a fifth layer. An upsampling path is shown on the right side of FIG. 6. Skip connections are provided between the data in each layer of the downsampling path and the respective layer of the upsampling path. The upsampling path starts with upsampling data at the fifth layer derived by a skip connection from the downsampling data at the fifth layer. The upsampling data at the fifth layer is transformed using a first deconvolution transformation to upsampling data at the fourth layer. The upsampling data at the fourth layer is transformed using a second deconvolution transformation to upsampling data at the third layer. The upsampling data at the third layer is transformed using a first depth-to-space transformation to upsampling data at the second layer. The upsampling data at the second layer is transformed using a second depth-to-space transformation to upsampling data at the top layer. The depth-to-space transformations reduce the resolution of their input data, but increase the data depth of the values at the resulting pixel locations in dependence on the input data. Thus, they reduce the resolution of the data without losing information proportionally to the reduction in resolution. Preferably, all the data is retained, by storing data defining pixels that are lost in the process of reducing resolution in the increased depth of data at each remaining pixel. In this way the space-to-depth transformation can be lossless. The space-to-depth transformations do the inverse. The max pooling transformations reduce resolution by selecting only a pixel of maximal value in a multiple-pixel region that is to be reduced to a single pixel. Data depth is maintained. In this way the max pooling transformations are lossy. The deconvolution transformations can form an estimate of a higher resolution image from a lower resolution image. It has been found that whilst the max pooling operations are relatively effective as part of a process for identifying defective pixels (since defective pixels typically yield extreme values), space-to-depth operations have advantages in a process for identifying stochastic noise, which may often result in intermediate noisy values.

Figure 7:
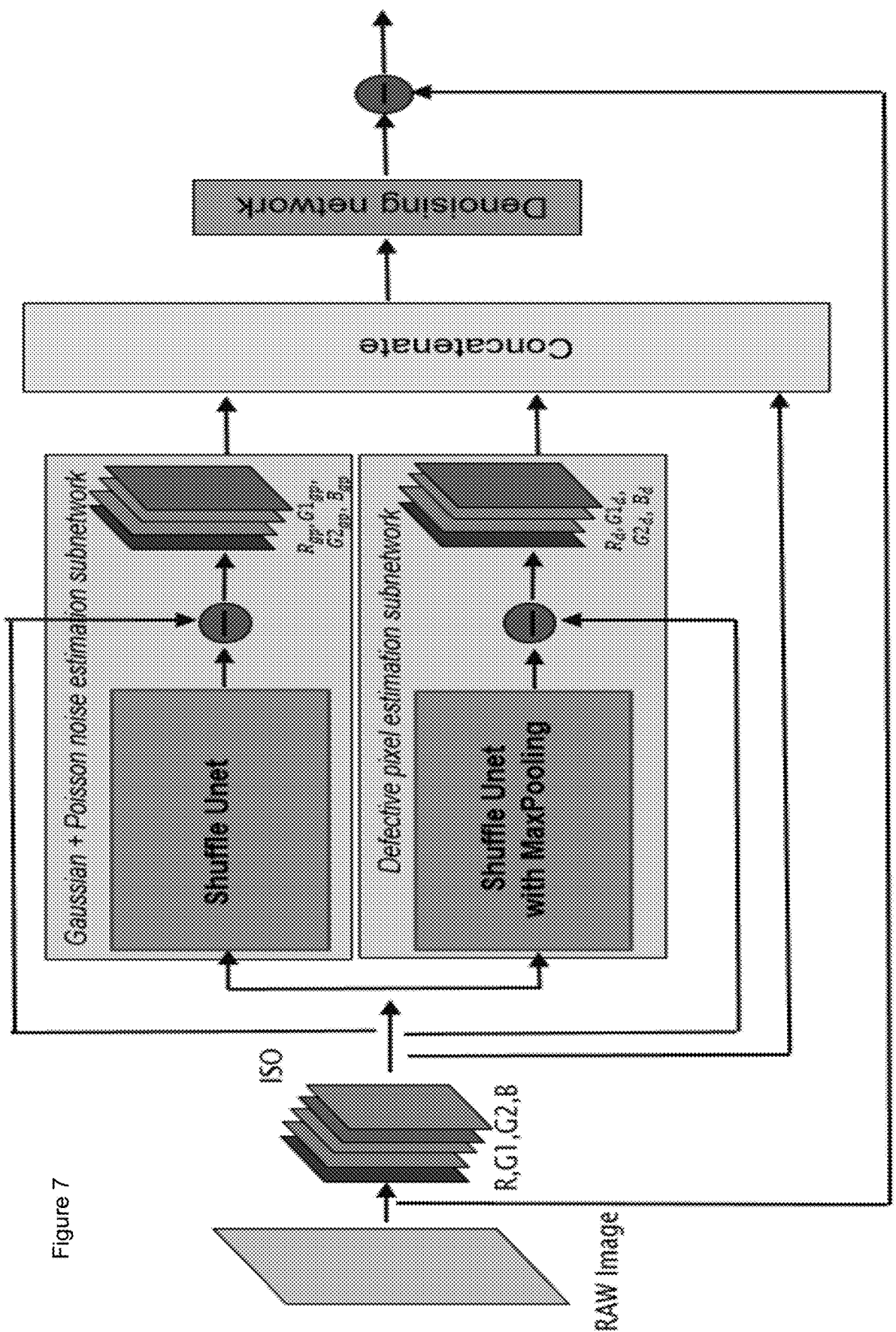
FIG. 7 shows a second processing architecture.

FIG. 7 shows an alternative architecture. The architecture of FIG. 7 is similar to the architecture of FIG. 5. Some points to note about the architecture of FIG. 7 are:

1. Different networks are used in the sub-networks for detecting stochastic and deterministic noise. The sub-network for detecting stochastic noise omits max pooling. The sub-network for detecting deterministic noise retains max pooling (e.g. the max pooling steps shown in FIG. 6). This can improve efficiency and the accuracy of detecting defective pixel noise.
2. The noise estimates formed by the two sub-networks are concatenated into a common data set with the original image, and the three are passed to a de-noising network. The de-noising network applies a trained neural network model to form an adapted noise estimate. Then that adapted noise estimate is subtracted from the original image in a subtraction block to form an adjusted image. This can improve the performance of the system in comparison to the alternative approach of summing the noise estimates from the two sub-networks and subtracting them from the input image. The de-noising network may be any suitable network trained for this purpose. The noise estimates from each subnetwork can be packed into a number of colour-specific channels (e.g. R, G, G, B in the case of RAW images) for input to the concatenation block.

Figure 8:
FIG. 8 shows a comparison of de-noised images.
Figure 9:
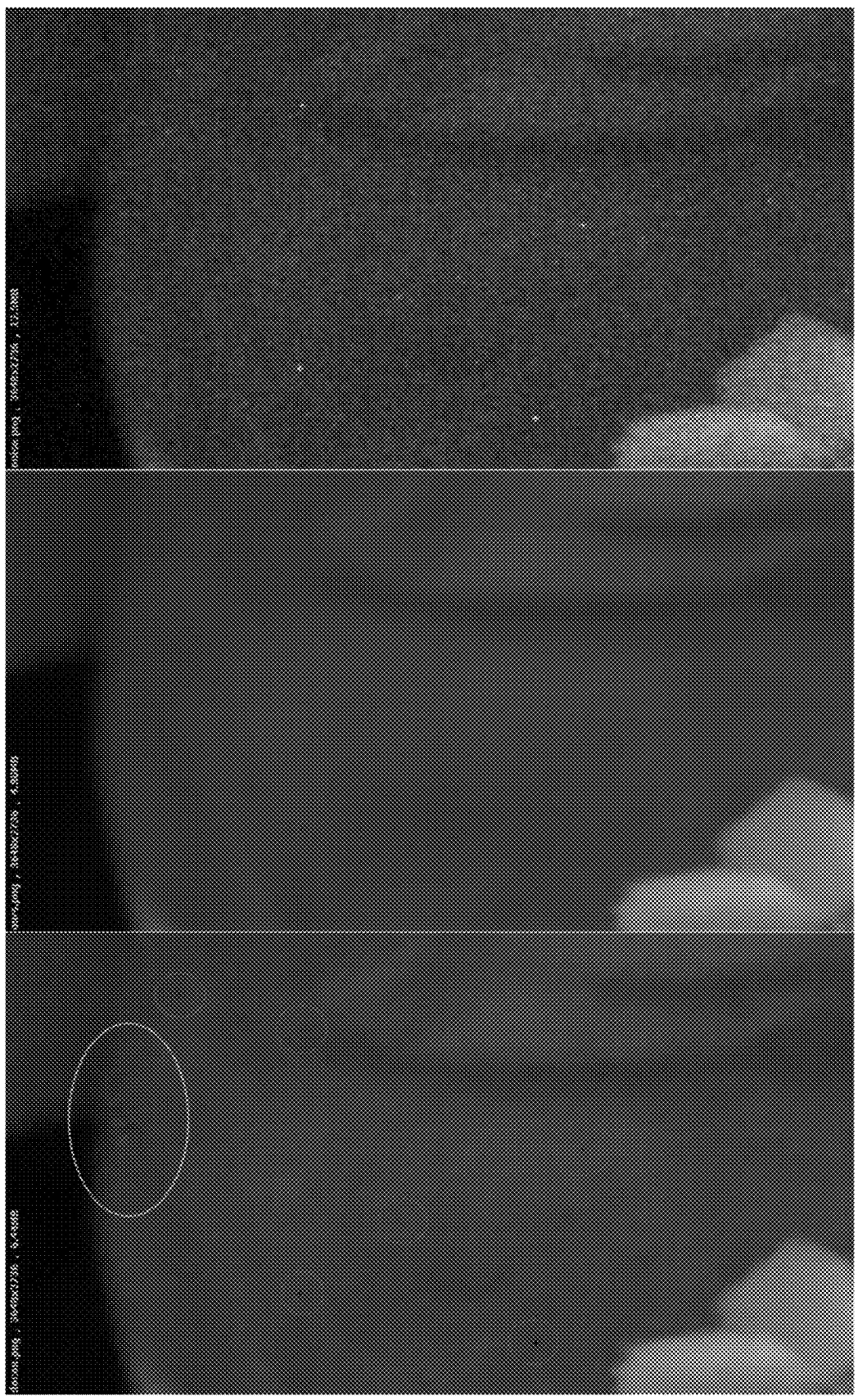
FIG. 9 shows a second comparison of de-noised images.

FIG. 8 shows a comparison between an image de-noised by an example of the present system (on the right) and an image de-noised using the well-known method DnCNN. (See Zhang, Kai, et al. "Beyond a gaussian denoiser: Residual learning of deep cnn for image denoising." IEEE Transactions on Image Processing 26.7 (2017): 3142-3155). FIG. 9 shows zoomed-in and cropped portions from (left to right) the image de-noised by DnCNN, the image de-noised by an example of the present system and the input image. The circled region in the left-most image shows an area of artefacts generated by the DnCNN method.

When a captured image is being de-noised, it is preferred to apply the present system prior to operations such as de-mosaicing and dynamic range compression.

The overall networks of FIGS. 5 and 7 can be trained end-to-end, using noisy image/clean ground truth pairs. This can improve the accuracy of the resulting models.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present application may consist of any such individual feature or combination of features. In view of the foregoing description it will be evident to a person skilled in the art that various modifications may be made within the scope of the application.

What is claimed is:

1. An image processing device, comprising:
at least one processor; and one or more memories coupled to the at least one processor and storing programming instructions for execution by the at least one processor to estimate noise in an image, the image being represented by a set of pixels, and each pixel of the set of pixels having a value associated with the pixel on each of one or more channels, wherein estimating the noise in the image comprises:
  processing, using a first trained model that detects stochastic noise, data derived from the image to obtain a first noise estimate, wherein the first trained model detects at least one of Poisson noise or Gaussian noise;
  processing, using a second trained model that detects extreme pixel values, data derived from the image to obtain a second noise estimate; and
  combining the first and second noise estimates to obtain an aggregated noise estimate.

2. The image processing device as claimed in claim 1, wherein the first trained model has a higher accuracy in detecting the at least one of Poisson noise or Gaussian noise than the second trained model.

3. The image processing device as claimed in claim 1, wherein the second trained model has a higher accuracy in detecting defective pixel noise than the first trained model.

4. The image processing device as claimed in claim 1, wherein the one or more memories store the programming instructions for execution by the at least one processor to subtract the aggregated noise estimate from the image to obtain a de-noised image.

5. The image processing device as claimed in claim 1, wherein the one or more memories store the programming instructions for execution by the at least one processor to process, using a third trained model, the image and the aggregated noise estimate to obtain a de-noised image.

6. The image processing device as claimed in claim 1, wherein the first and second trained models comprise processing architectures to: (a) process data derived from the image to progressively reduce resolution through a first series of stages to obtain intermediate data; and (b) process the intermediate data to progressively increase resolution through a second series of stages to obtain a respective noise estimate; there being skip connections for providing feed-through between corresponding stages of the first and second series.

7. The image processing device as claimed in claim 6, wherein the first series of stages of the second trained model comprise: (a) a first stage that processes the data derived from the image to reduce the resolution and increase data depth to obtain second intermediate data, and (b) a second stage that processes the second intermediate data to reduce resolution without increasing the data depth to obtain third intermediate data.

8. The image processing device as claimed in claim 7, wherein the first stage is a space-to-depth stage.

9. The image processing device as claimed in claim 7, wherein the second stage is a max pooling stage.

10. The image processing device as claimed in claim 6, wherein none of the stages in the first series of stages of the first trained model increases data depth.

11. A method for training an image processing model, comprising:
  receiving a plurality of pairs of images, wherein each pair of images represents a common scene and a first image of the pair which comprises more noise than a second image of the pair; and
  for the each pair of images,
    processing, using a first model that estimates stochastic noise in the images, data derived from the first image of the pair to obtain a first noise estimate;
    processing, using a second model that detects extreme pixel values, data derived from the first image of the pair to obtain a second noise estimate;
    combining the first noise estimate and the second noise estimate to obtain an aggregated noise estimate;
    estimating a difference between the second image of the pair and the first image of the pair de-noised in dependence on the aggregated noise estimate; and
    adapting the first and second models in dependence on the estimated difference.

12. The method as claimed in claim 11, wherein:
  the first and second models comprise processing architectures to: (a) process data derived from the first image of the pair to progressively reduce resolution through a first series of stages to obtain intermediate data; and (b) process the intermediate data to progressively increase resolution through a second series of stages to obtain a respective noise estimate; there being skip connections for providing feed-through between corresponding stages of the first and second series; and
  wherein the first series of stages of the second model comprise: (a) a first stage that processes the data derived from the first image of the pair to reduce the resolution and increase data depth to obtain second intermediate data, and (b) a second stage that processes the second intermediate data to reduce resolution without increasing data depth to obtain third intermediate data.

13. An image processing model adapted by the method of claim 11.

14. An image processing device comprising at least one processor and one or more memories, the one or more memories storing in non-transient form instructions executable by the at least one processor to implement an image processing model to:
  receive a plurality of pairs of images, wherein each pair of images represents a common scene and a first image of the pair which comprises more noise than a second image of the pair; and
  for the each pair of images,
    process, using a first model that estimates stochastic noise in the images, data derived from the first image of the pair to obtain a first noise estimate;
    process, using a second model that detects extreme pixel values, data derived from the first image of the pair to obtain a second noise estimate;
    combine the first noise estimate and the second noise estimate to obtain an aggregated noise estimate;
    estimate a difference between the second image of the pair and the first image of the pair de-noised in dependence on the aggregated noise estimate; and
    adapt the first and second models in dependence on the estimated difference.

15. The image processing device as claimed in claim 14, wherein:
  the first and second models comprise processing architectures to: (a) process data derived from the first image of the pair to progressively reduce resolution through a first series of stages to obtain intermediate data; and (b) process the intermediate data to progressively increase resolution through a second series of stages to obtain a respective noise estimate; there being skip connections for providing feed-through between corresponding stages of the first and second series; and wherein the first series of stages of the second model comprise: (a) a first stage that processes the data derived from the first image of the pair to reduce the resolution and increase data depth to obtain second intermediate data, and (b) a second stage that processes the second intermediate data to reduce resolution without increasing data depth to obtain third intermediate data.

\* \* \* \* \*